United States Patent [19]
Park

[11] Patent Number: 5,185,618
[45] Date of Patent: Feb. 9, 1993

[54] METHOD AND CIRCUIT FOR PREVENTING IRREGULARITIES OF COLOR PRINTING POSITION IN A VIDEO COLOR PRINTER

[75] Inventor: Se-Gab Park, Kyounggi, Rep. of Korea

[73] Assignee: Samsung Electronics Co., Ltd., Suwon, Rep. of Korea

[21] Appl. No.: 695,334

[22] Filed: May 3, 1991

[30] Foreign Application Priority Data

May 19, 1990 [KR] Rep. of Korea ............... 1990-7203

[51] Int. Cl.$^5$ ..................................... G01D 15/24
[52] U.S. Cl. ................................. 346/138; 346/134; 346/76 PH
[58] Field of Search ............... 346/76 PH, 1.1, 134, 346/138

[56] References Cited

U.S. PATENT DOCUMENTS

| | | | |
|---|---|---|---|
| 4,586,834 | 5/1986 | Hachisuga et al. | 346/76 PH |
| 4,642,656 | 2/1987 | Shibuya et al. | 346/76 PH |
| 4,815,869 | 3/1989 | Van Dyck | 346/76 PH |
| 4,815,872 | 3/1989 | Nagashima | 346/76 PH |

Primary Examiner—Benjamin R. Fuller
Assistant Examiner—Huan Tran
Attorney, Agent, or Firm—Robert E. Bushnell

[57] ABSTRACT

A method and a circuit for preventing the irregularities of color printing position in the heating-transcription video color printer of non-impact type, are disclosed. The inventive circuit includes a JK flip-flop, a microcomputer having the first data terminal receiving the input signal of logic "high" as level of the power supply voltage, the second data terminal outputting a printing-control signal, the third data terminal receiving an inverted output of the JK flip-flop, the fourth data terminal outputting a stepping motor drive control signal, the fifth data terminal outputting a printing-completion signal for one color, a thermal print head drive controller for transferring a thermal print head drive signal and the thermal print head drive signal for the next color line by line, a stepping motor drive controller for producing the stepping motor drive control signal when one line is printed, and drum and a thermal print head driver for printing the given color line by line, by means of receiving the signal of the thermal print head drive controller.

4 Claims, 3 Drawing Sheets

METHOD AND CIRCUIT FOR PREVENTING IRREGULARITIES OF COLOR PRINTING POSITION IN A VIDEO COLOR PRINTER

BACKGROUND OF THE INVENTION

The present invention relates to a video color printer, more particularly to a method and a circuit for preventing irregularities of the color printing position generated by overlapping of the drive timing of a drum over the drive timing of a thermal print head, in a heating-transcription video color printer of non-impact type.

Conventional heating-transcription video color printer is operated by means of heating of a thermal print head according to image signals of red R, green G and blue B, whereby three colors, which are yellow Y, magenta M and cyan C, are printed one by one based on the given order. The process of printing of one color among them is followed. One line is printed through the heating of the thermal print head in the static state of drum. After printing the one line of the given color, the drum is driven by a stepping motor, to be shifted to the next line in order to print the next line of the given color. After printing the given color on the given number of lines in the manner described above, the driving of the drum makes another color be printed on initial printing position of the given color in the same manner as described above. That is, the printing of the whole image is constituted of the serial print steps of Y, M and C color.

In the above printer, however a driving-timing of the drum operated by the rotation of the stepping motor may be not coincident with a heating-timing of the thermal print head. Thus the printing positions of the three colors become irregular on the initial printing positions and on the each of the line positions. That is, conventional printer has a problem that if the heating of the thermal print head happens in the state of the rotation of the drum, the color imprinting operation of the image makes a sliding phenomena on the picture, and thus provides a deteriorated picture quality to the video color printer.

SUMMARY OF THE INVENTION

It is an object of the present invention to provide a method and a circuit capable of preventing the irregularities of color printing positions upon operation of video color printer of non-impact heating-transcription type.

To achieve the above object, a preferred embodiment of the present invention includes a micro-computer for controlling the timing of a drum and a thermal print head of the video color printer by using a vertical synchronizing signal of the input image signals.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF THE PREFERRED EMBODIMENT

Figure 1:
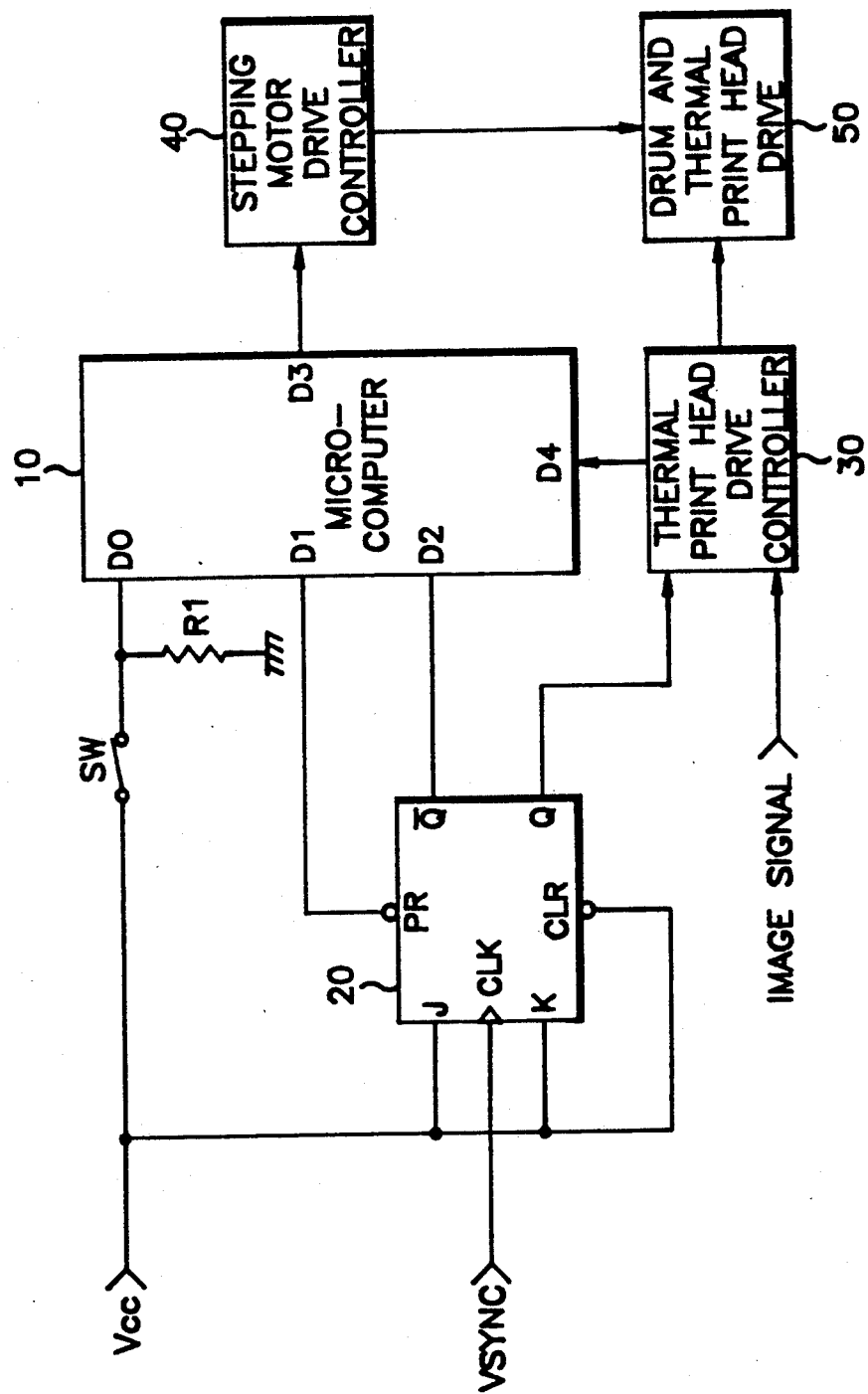
FIG. 1 shows a diagrammatic circuit according to the present invention.

Referring to FIG. 1, the circuit according to the present invention comprises a printing switch SW having one terminal connected with a power supply voltage Vcc, a resistor R1 connectable between a ground voltage and the other terminal of the printing switch SW, the micro-computer 10 having five data terminal $D_0$, $D_1$, $D_2$, $D_3$, and $D_4$, the first data terminal $D_0$ being commonly connected to the printing switch SW and the resistor $R_1$, a JK flip-flop 20, a thermal print head drive controller 30, a stepping motor drive controller 40 connected to the fourth data terminal $D_3$, and a drum and thermal print head driver 50 connected to the stepping motor drive controller 40 and the thermal print head drive controller 30. Wherein the JK flip-flop 20 has input terminals J and K and clear terminal CLR connected to the power supply voltage Vcc, a clock terminal CLK receiving a vertical synchronizing signal VSYNC, a preset terminal connected to the second data terminal $D_1$ of the micro- computer 10, an inverted output terminal $\overline{Q}$ connected to third data terminal $D_2$ of the micro-computer 10, and an output terminal $\overline{Q}$ connected to a thermal print head drive controller 30. The thermal print head drive controller 30 is connected to both the output terminal Q of the JK flip-flop 20 and the fifth data terminal $D_4$ of the micro-computer 10, and receives the image signals.

When the printing switch SW is turned on by an user, the input signal of logic "high" as level of the power supply voltage Vcc is applied to the first data terminal $D_0$, and the micro-computer 10 generates a printing-control signal through the second data terminal $D_1$. When the printing switch SW is turned on, also the inputs J and K of the JK flip-flop 20, and the clear terminal CLR receive the logic "high" signal as level of the power supply voltage Vcc, and thus the signal of the inverted output $\overline{Q}$ terminal is applied to the third data terminal $D_2$, so as to send a stepping motor drive control signal through the fourth data terminal $D_3$, the signal of the inverted output $\overline{Q}$ being the printing-completion signal for one line. The micro- computer 10 counts the number of the printed lines to produce the printing-completion signal for one color through the fifth data terminal $D_4$. The JK flip-flop 20 receives the vertical synchronizing signal VSYNC through the clock terminal CLK, and generates the thermal print head drive control signal and printing-completion signal for the one line respectively through the output terminal Q of the JK flip-flop 20 and the inverted output terminal $\overline{Q}$ when the printing-control signal is supplied to the preset terminal PR connected the second data terminal $D_1$ of the micro-computer 10. The thermal print head drive controller 30 synchronizes the thermal print head drive control signal after receiving image signal R, G, B, and transfers a thermal print head drive signal line by line, to the drum and thermal print head drive controller 50. Also the thermal print head drive controller 30 transfers the thermal print head drive signal of the next color line by line, in dependence upon the printing-completion signal for one color, to the drum and thermal print head drive controller 50. In dependence upon signal from the fourth data terminal $D_3$ of the mic: -computer 10, the stepping motor drive controller 40 produces the stepping motor drive control signal when one line is printed. The drum and thermal print head driver 50 prints the given color, line by line, by means of receiving the signal of the thermal print head. Also when the printings for the one line and the one color are completed, the stepping motor driving signal, produced by driving of the stepping motor, has drum driven.

Figure 2:
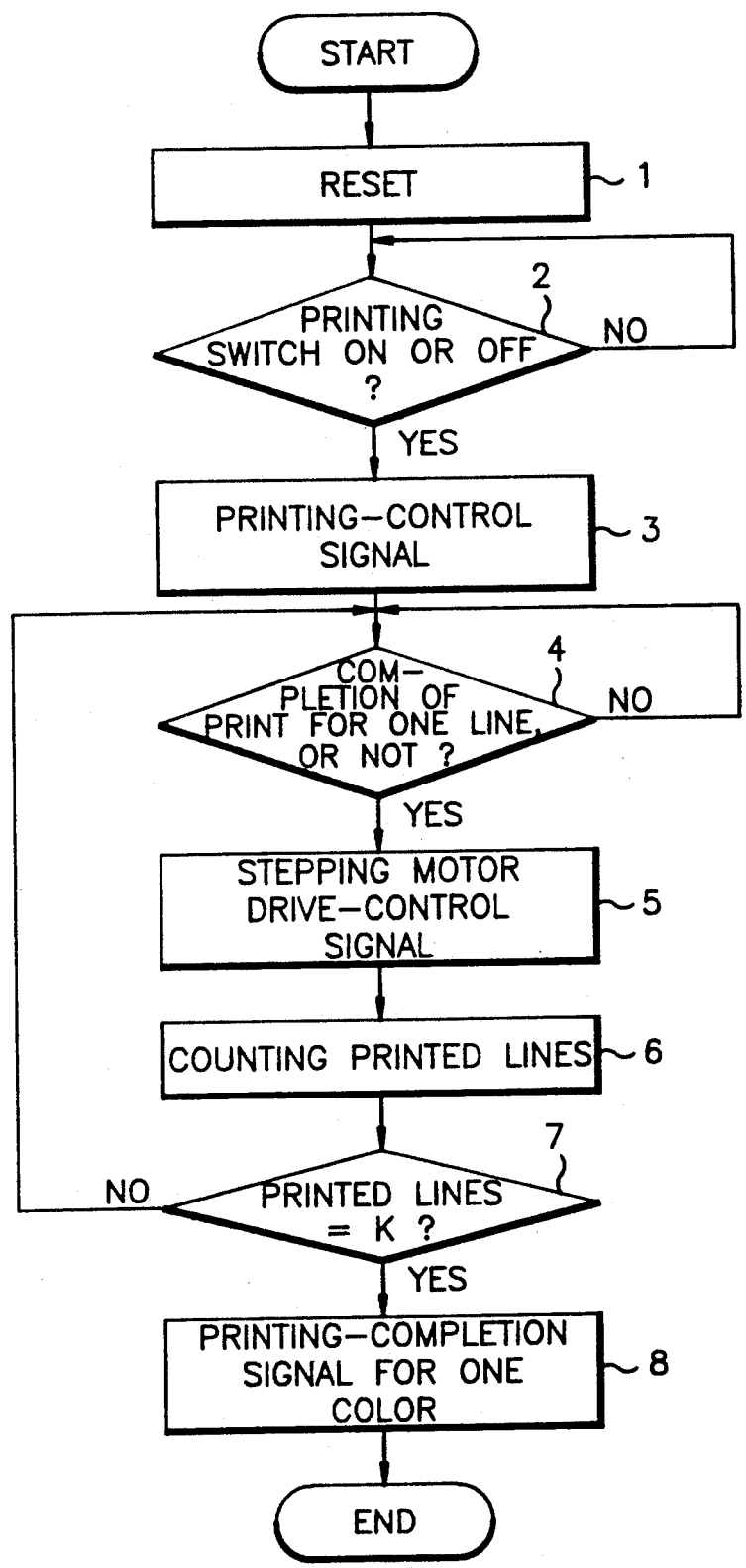
FIG. 2 shows a flow chart according to the present invention.

Referring to FIG. 2, the process of the operation according to the present invention is followed: the first process for making the printing operation be started by outputting the printing-control signal if the printing switch SW is turned on, after checking the state of the printing switch SW; the second process for checking whether or not the printing operation for one line is completed to make the next printing operation be started by driving of the drum, the driving of the drum depending on the stepping motor drive control signal, and thereafter continuously checking the completion of the printing operation, with counting the number of printed lines, until the counted lines are accorded with a given number; and the third process for making the printing operation for another color be started by generation of the printing-completion signal for one color if the number of printed lines for one color in the second process is accorded with a given number.

Figure 3:
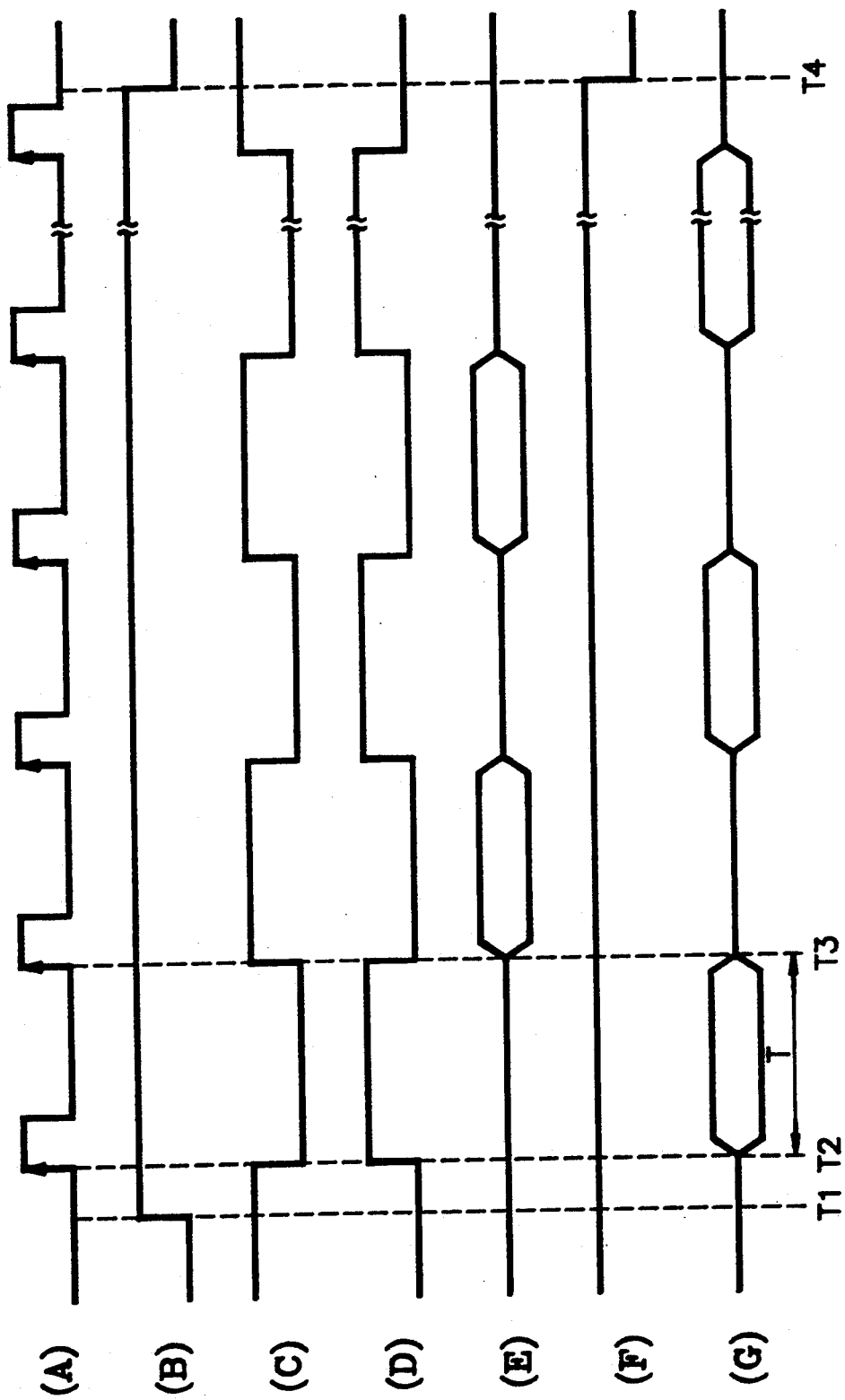
FIG. 3 shows timing diagrams of each component shown in FIG. 1.

FIG. 3 shows the operation timings in the each component of FIG. 2. The pulse A represents the timing of the vertical synchronizing signal VSYNC applied to the clock terminal CLK of the JK flip-flop 20, the pulse A having a period of T, and the pulse B that the printing-control signal of logic "high" from the micro-computer 10 is generated when the printing switch SW is turned on at the time of $T_1$. The pulse C shows the timing of the thermal print head drive control signal synchronized by the vertical synchronizing signal VSYNC, the pulse C being a signal from the output terminal Q of the JK flip-flop 20, D the printing-completion signal for one line, the pulse D being synchronized by the vertical synchronizing signal VSYNC, and generated from the inverted output terminal $\overline{Q}$ of the JK flip-flop 20, E the stepping motor drive signal, the pulse E being synchronized at the falling edge of the above printing-completion signal for one line, and generated from the micro-computer 10. The pulse F represents the printing-completion signal for one color, the pulse F being generated from the micro-computer 10, and becoming a logic "low" state when the counted number of the printed lines is reached to a given number, and G the output signal from the thermal print head drive controller 30, the pulse G being synchronized at the falling edge of the thermal print head drive control signal.

Now, the printing operation of the FIG. 1 and FIG. 2 will be described in detail with reference to the flow chart of FIG. 3.

Provided that the voltage source is turned pn, the system gets the reset state in step of FIG. 2. The vertical synchronizing signal VSYNC of FIG. 3A, separated from an image signals of a video signal processor (not shown), is applied to the clock terminal CLK of the JK flip-flop 20 of FIG. 1, and image signals such as R, G and B, are applied to the thermal print head drive controller 30.

The micro-computer 10, initialized in the step 1 based on the reset of the system, detects whether the printing switch SW is turned on or off in the step 2. If the printing switch SW is in off-state, the micro-computer 10 will be continuously checking the state of the printing switch SW until it is turned on. On the other hand, if the printing switch SW is turned on at the time of $T_1$ in order to print three colors Y, M and C, the first data terminal $D_0$ of the micro-computer 10 receives a signal of logic "high" level as that of power supply voltage Vcc. As a result the micro-computer 10 detects the turn-on state of the printing switch SW to go to the next step 3.

In the step 3, the printing-control signal as shown in the FIG. 3B is produced through the second data terminal $D_1$, the signal as shown in the FIG. 3B being logic "high" state at the time of $T_1$. The printing-control signal is applied to the JK flip-flop through the preset terminal PR connected the second data terminal $D_1$, and synchronized by the vertical synchronizing signal VSYNC. Thus the printing-control signal is outputted through the output terminal Q of the JK flip-flop 20.

The thermal print head drive controller 30, accordingly, receives the thermal print head drive control signal from the JK flip-flop 20, and produces the thermal print head drive signal, so as to print the colors that are Y, M and C corresponding to the video signals of R, G, and B, the thermal print head drive signal being synchronized at the falling edge of the thermal print head drive control signal. At this time, the thermal print head drive signal for printing one color is generated according to a given order determined among the three colors Y, M, and C, and lets one line be printed in one period as shown FIG. 3G. Thereby the drum and thermal print head driver 50 carries out the printing operation for a given color line by line, in dependence upon the thermal print head drive signal. On the other hand, the JK flip-flop 20 generates the printing-completion signal for a given line through the inverted output terminal $\overline{Q}$, as the pulse shown in FIG. 3D.

The micro-computer 10 goes to the step 4, after generating the printing-control signal in the step 3. In the step 4, the micro-computer receives the printing-completion signal for one line through the third data terminal $D_2$ and checks whether or not the printing operation for one line has been completed. Only after the printing for one line is completed, the micro-computer 10 can carries out the step 5.

In the step 5, the stepping motor drive control signal is synchronized at the falling edge of the printing-completion signal for one line, and thereafter is generated from the fourth data terminal $D_3$ of the micro-computer 10, as the pulse shown in FIG. 3E. In the step 6, the micro-computer 10 counts the number of the printed lines. The stepping motor drive controller 40 receives the stepping motor drive control signal and generates the stepping motor drive signal. Hence, the drum and the thermal head driver 50 drives the stepping motor (not shown) inside the drum and the thermal head driver 50, and makes the drum be rotated by one line after receiving the stepping motor drive signal. Then the next line is printed by the thermal print head drive signal of the next line.

In the step 7, the micro-computer 10 checks whether or not the counted value is accorded with the given number K. The given number K is the number determined with reference to the number of lines of the each signal to be printed in the video color printer. If the number of printed lines does not reach a given number K, steps from the step 4 to the step 7 are repeated until the number of printed lines matches the given number K, and the micro-computer 10 detects the state that a printing operation for one color is completed. In the step 8 the micro-computer 10 produces the printing-completion signal for one color through the fifth data terminal $D_4$, the printing- completion signal for one color being at the state of logic "low" as the pulse shown in FIG. 3F. Then, the thermal print head drive controller 30 receives the printing-completion signal for one color from the fifth data terminal D4 of the microcomputer 10, and prints the printed lines as next color in the same method as described above.

Based on the above process, whole printing for the colors Y, M, and C can be accomplished.

As a result, the present invention obtains the advantage that between initial printing positions of the color signals Y, M, C do not occur the irregularities generated on initial position at printing each of them, and on the initial position of the pre-color at overlapping each of them, by means of printing the color signals using the thermal print head drive signal and the stepping motor drive control signal, synchronized by the vertical synchronizing signal shown in FIG. 3A, and thereafter rotating the drum.

As described above, the present invention, as the circuit for controlling the drive timings of the drum the thermal print head in dependence upon the vertical synchronizing signal, prevents the color printing position from becoming irregular to provide good quality picture to the heating-transcription video color printer of the non-impact type.

What is claimed is:

1. A method for preventing color printing position from becoming irregular in a video color printer, comprising the steps of:

generating a printing-control signal in response to a printing switch to enable production of a sequence of a thermal print head drive signal and a stepping motor drive signal in synchronism with a vertical synchronizing signal, said thermal print head drive signal being indicative of a printing period of a video signal on a line-by-line basis and said stepping motor drive signal being indicative of a transferring period for driving a platen drum to transfer a printable medium on said line-by-line basis;

sending one data line of said video signal to a thermal print head in response to said thermal print head drive signal so as to print said one data line in a first selected color onto a printable medium during said printing period;

driving said platen drum in response to said stepping motor drive signal so as to transfer said printable medium by one line during said transferring period in order to position said platen drum onto a next line of said printable medium; and making a count of each said printing period of said video signal in said first selected color and making a comparison of said count with a predetermined number in order to terminate printing of said video signal in said first selected color on said line-by-line basis and to enable printing of said video signal in a second selected color in dependence upon said comparison.

2. A circuit for preventing color printing position from becoming irregular in a video color printer, said circuit comprising:

a switch having a first power terminal connected to a power supply voltage, said switch being turned on or off by an user;

resistive means connectable between ground and a second power terminal of said switch;

control means for generating a printing-control signal through a first data terminal in dependence upon reception of a logic high signal when said switch is turned on, and for producing a stepping motor drive control signal through a third data terminal in dependence upon reception of a printing-completion signal for one line of video signals through a second data terminal, for counting a number of the printed lines to enable transmission of a printing-completion signal for one color through a fourth data terminal, said control means having a fifth data terminal connected to said switch;

flip-flop means for respectively generating a thermal print head drive control signal and said printing-completion signal for one line through an output terminal and an inverted output terminal when said printing-control signal is input to a preset terminal in dependence upon reception of a vertical synchronizing signal through a clock terminal, said flip-flop means having an input terminal, a clear terminal, said preset terminal, and said inverted output terminal respectively connected to said power supply voltage, said first data terminal, and said second data terminal of the said control means;

thermal print head drive controller means for transferring a thermal print head drive signal in a line-by-line basis by synchronizing said thermal print head drive control signal in dependence upon reception of said video signals, and for transferring a thermal print head drive control signal of a next color in said line-by-line basis in dependence upon reception of said printing-completion signal for one color, said thermal print head drive controller means being connected to said output terminal of said flip-flop means and said fourth data terminal of said control means;

stepping motor drive controller means for generating a stepping motor drive signal in dependence upon reception of said stepping motor drive control signal from said control means, when a printing operation for one line is completed, said stepping motor drive controller means having an input terminal connected to said third data terminal of said control means;

a platen drum; and thermal print head driver means for printing a given color in said line-by-line basis in dependence upon said thermal print head drive signal, and for driving said platen drum by a stepping motor in dependence upon said stepping motor drive signal, said platen drum and said thermal print head drive means being connectable between output terminals of said thermal print head drive controller means and said stepping motor drive controller means.

3. A circuit as set forth in claim 2, further comprised of said control means having a micro-computer.

4. A circuit as set forth in claim 2, further comprised of said flip-flop means having a JK flip-flop.

* * * * *